United States Patent
Tarraf et al.

(10) Patent No.: US 9,258,719 B2
(45) Date of Patent: Feb. 9, 2016

(54) METHODS AND APPARATUS FOR PARTITIONING WIRELESS NETWORK CELLS INTO TIME-BASED CLUSTERS

(71) Applicant: Viavi Solutions Inc., Milpitas, CA (US)

(72) Inventors: Osama Tarraf, Ashburn, VA (US); Arif Ansari, Bethesda, MD (US); Emil Bergner, Arlington, VA (US)

(73) Assignee: Viavi Solutions Inc., Milpitas, CA (US)

( * ) Notice: Subject to any disclaimer, the term of this patent is extended or adjusted under 35 U.S.C. 154(b) by 244 days.

(21) Appl. No.: 13/670,830

(22) Filed: Nov. 7, 2012

(65) Prior Publication Data

US 2013/0114464 A1    May 9, 2013

Related U.S. Application Data

(60) Provisional application No. 61/557,147, filed on Nov. 8, 2011.

(51) Int. Cl.
    *H04L 12/28* (2006.01)
    *H04W 24/02* (2009.01)

(52) U.S. Cl.
    CPC ................................. *H04W 24/02* (2013.01)

(58) Field of Classification Search
    None
    See application file for complete search history.

(56) References Cited

U.S. PATENT DOCUMENTS

| | | | |
|---|---|---|---|
| 5,425,051 A | 6/1995 | Mahany | |
| 5,796,722 A | 8/1998 | Kotzin et al. | |
| 5,802,144 A | 9/1998 | Laird et al. | |
| 5,859,839 A | 1/1999 | Ahlenius et al. | |
| 5,873,040 A | 2/1999 | Dunn et al. | |
| 6,051,408 A | 4/2000 | Bartsch et al. | |
| 6,069,871 A | 5/2000 | Sharma et al. | |
| 6,115,393 A | 9/2000 | Engel et al. | |
| 6,138,016 A | 10/2000 | Kulkarni et al. | |

(Continued)

FOREIGN PATENT DOCUMENTS

| | | |
|---|---|---|
| EP | 2129175 | 12/2010 |
| EP | 1952657 | 8/2011 |

(Continued)

OTHER PUBLICATIONS

International Search Report and Written Opinion mailed Jun. 18, 2010 for PCT Application No. PCT/US2010/31603.

(Continued)

*Primary Examiner* — Timothy J Weidner
*Assistant Examiner* — Jana Blust
(74) *Attorney, Agent, or Firm* — Harrity & Harrity, LLP (57) ABSTRACT

In some embodiments, an apparatus includes a cluster partitioning module and an optimization module. The cluster partitioning module receives a first performance indicator set for a first instance of a time period set. The cluster partitioning module defines a recurring schedule set, where each time period from the recurring schedule set is associated with a performance indicator from the first performance indicator set and within a predefined range of a performance indicator associated with the remaining time periods from the recurring schedule set. The optimization module receives a second performance indicator set for a second instance of the time period set. The optimization module defines a metric value based on the second performance indicator set, and causes a change in a network implementation based on the metric value at each time period from a third instance of the time period set and from the recurring schedule set.

20 Claims, 4 Drawing Sheets

(56) References Cited

U.S. PATENT DOCUMENTS

| | | | |
|---|---|---|---|
| 6,141,565 A | 10/2000 | Feuerstein et al. | |
| 6,253,077 B1 | 6/2001 | Burt et al. | |
| 6,304,556 B1 | 10/2001 | Haas | |
| 6,400,335 B1 | 6/2002 | Weaver et al. | |
| 6,545,690 B1 | 4/2003 | Hernandez | |
| 6,549,529 B1 | 4/2003 | Drabeck et al. | |
| 6,574,477 B1 | 6/2003 | Rathunde | |
| 6,729,929 B1 | 5/2004 | Sayers et al. | |
| 6,829,491 B1 | 12/2004 | Yea et al. | |
| 6,842,431 B2* | 1/2005 | Clarkson et al. | 370/254 |
| 6,937,863 B1 | 8/2005 | Gordon et al. | |
| 6,985,704 B2 | 1/2006 | Yang et al. | |
| 6,999,766 B1 | 2/2006 | Padovani | |
| 7,006,805 B1 | 2/2006 | Sorrells et al. | |
| 7,016,685 B1 | 3/2006 | Cain et al. | |
| 7,149,478 B2 | 12/2006 | Hawe | |
| 7,221,928 B2 | 5/2007 | Laird et al. | |
| 7,260,415 B1 | 8/2007 | Oh | |
| 7,313,402 B1 | 12/2007 | Rahman | |
| 7,323,945 B2 | 1/2008 | Cyr et al. | |
| 7,349,765 B2 | 3/2008 | Reaume et al. | |
| 7,353,160 B2* | 4/2008 | Voigt | 703/17 |
| 7,385,503 B1 | 6/2008 | Wells et al. | |
| 7,461,037 B2 | 12/2008 | Hätönen et al. | |
| 7,477,920 B2 | 1/2009 | Scheinert et al. | |
| 7,505,010 B2 | 3/2009 | Franzon et al. | |
| 7,519,860 B2 | 4/2009 | Hätönen et al. | |
| 7,529,215 B2 | 5/2009 | Osterling | |
| 7,561,876 B2 | 7/2009 | Chiou et al. | |
| 7,567,822 B2 | 7/2009 | Hart et al. | |
| 7,577,103 B2 | 8/2009 | Diaz et al. | |
| 7,590,589 B2 | 9/2009 | Hoffberg | |
| 7,606,287 B2 | 10/2009 | Mahany | |
| 7,609,747 B2 | 10/2009 | Mahany | |
| 7,623,455 B2 | 11/2009 | Hilla et al. | |
| 7,653,407 B2 | 1/2010 | Backes et al. | |
| 7,663,555 B2 | 2/2010 | Caimi et al. | |
| 7,747,712 B2 | 6/2010 | Petersen et al. | |
| 7,768,968 B2 | 8/2010 | Plehn et al. | |
| 7,827,268 B2 | 11/2010 | Monier et al. | |
| 7,839,882 B2* | 11/2010 | Soliman | 370/437 |
| 7,877,095 B2 | 1/2011 | Hubner et al. | |
| 7,877,108 B2 | 1/2011 | Wengerter et al. | |
| 7,899,890 B2 | 3/2011 | Petersen et al. | |
| 7,904,080 B2 | 3/2011 | Atkins et al. | |
| 7,929,457 B2 | 4/2011 | Healy et al. | |
| 7,941,136 B2 | 5/2011 | Reed et al. | |
| 7,969,896 B2 | 6/2011 | Sheinfeld et al. | |
| 8,010,469 B2 | 8/2011 | Kapoor et al. | |
| 8,018,925 B2 | 9/2011 | Noriega | |
| 8,023,529 B2 | 9/2011 | Oh et al. | |
| 8,032,131 B2 | 10/2011 | Dobson et al. | |
| 8,045,996 B2 | 10/2011 | Brunner et al. | |
| 8,050,191 B2 | 11/2011 | Tirpak et al. | |
| 8,117,294 B2 | 2/2012 | Pollakowski et al. | |
| 8,144,619 B2 | 3/2012 | Hoffberg | |
| 8,159,932 B1 | 4/2012 | Hart et al. | |
| 8,185,124 B2 | 5/2012 | Antic et al. | |
| 8,208,924 B2 | 6/2012 | Han et al. | |
| 8,295,877 B2 | 10/2012 | Hui et al. | |
| 8,320,850 B1 | 11/2012 | Khlat | |
| 8,355,728 B2 | 1/2013 | Jung et al. | |
| 8,385,900 B2 | 2/2013 | Trigui | |
| 8,509,762 B2 | 8/2013 | Li et al. | |
| 8,626,075 B2* | 1/2014 | Turk et al. | 455/67.11 |
| 8,665,835 B2* | 3/2014 | Hussein et al. | 370/334 |
| 2002/0056066 A1 | 5/2002 | Gesbert et al. | |
| 2003/0100344 A1 | 5/2003 | Garmonev et al. | |
| 2003/0191856 A1 | 10/2003 | Lewis et al. | |
| 2003/0228857 A1 | 12/2003 | Maeki | |
| 2003/0229478 A1 | 12/2003 | Rappaport et al. | |
| 2004/0018839 A1 | 1/2004 | Andric et al. | |
| 2004/0042473 A1 | 3/2004 | Park et al. | |
| 2004/0117226 A1 | 6/2004 | Laiho et al. | |
| 2004/0196834 A1 | 10/2004 | Ofek et al. | |
| 2004/0229621 A1 | 11/2004 | Misra | |
| 2004/0248589 A1 | 12/2004 | Gwon et al. | |
| 2004/0266442 A1 | 12/2004 | Flanagan et al. | |
| 2005/0009531 A1 | 1/2005 | Lindquist et al. | |
| 2005/0054339 A1 | 3/2005 | Merritt | |
| 2005/0064844 A1 | 3/2005 | McAvoy | |
| 2005/0111630 A1 | 5/2005 | Potorny et al. | |
| 2005/0176440 A1 | 8/2005 | Sang et al. | |
| 2005/0243723 A1 | 11/2005 | Randriamsay | |
| 2005/0259571 A1 | 11/2005 | Battou | |
| 2005/0267677 A1 | 12/2005 | Poykko et al. | |
| 2005/0272444 A1 | 12/2005 | Heffield et al. | |
| 2005/0277444 A1 | 12/2005 | Rensburg et al. | |
| 2006/0083170 A1 | 4/2006 | Silva et al. | |
| 2006/0221886 A1 | 10/2006 | Rao | |
| 2006/0239224 A1 | 10/2006 | Borst et al. | |
| 2006/0246844 A1 | 11/2006 | Kroboth et al. | |
| 2007/0002765 A1 | 1/2007 | Kadaba et al. | |
| 2007/0021151 A1 | 1/2007 | Mori et al. | |
| 2007/0066298 A1 | 3/2007 | Hurst | |
| 2007/0087756 A1 | 4/2007 | Hoffberg | |
| 2007/0094729 A1 | 4/2007 | Hoefelmeyer et al. | |
| 2007/0123271 A1 | 5/2007 | Dickinson | |
| 2007/0129086 A1 | 6/2007 | Toone | |
| 2007/0147297 A1 | 6/2007 | Diaz et al. | |
| 2007/0195721 A1 | 8/2007 | Backes et al. | |
| 2007/0197215 A1 | 8/2007 | Ben-Yahuda et al. | |
| 2007/0218862 A1 | 9/2007 | Tatman et al. | |
| 2007/0248039 A1 | 10/2007 | Backes et al. | |
| 2008/0004078 A1 | 1/2008 | Barratt et al. | |
| 2008/0016198 A1 | 1/2008 | Johnston-Watt et al. | |
| 2008/0020801 A1 | 1/2008 | Fesas et al. | |
| 2008/0039089 A1 | 2/2008 | Berkman et al. | |
| 2008/0096566 A1 | 4/2008 | Brunner et al. | |
| 2008/0125142 A1 | 5/2008 | Chang-Hung | |
| 2008/0130790 A1 | 6/2008 | Forenza et al. | |
| 2008/0207195 A1 | 8/2008 | Ranta et al. | |
| 2008/0225714 A1 | 9/2008 | Denis | |
| 2008/0261622 A1 | 10/2008 | Lee et al. | |
| 2008/0268833 A1 | 10/2008 | Huang et al. | |
| 2008/0311924 A1 | 12/2008 | Lucidarme | |
| 2009/0003236 A1 | 1/2009 | Aoyama et al. | |
| 2009/0003312 A1 | 1/2009 | Velazquez et al. | |
| 2009/0023477 A1 | 1/2009 | Staudte | |
| 2009/0036116 A1 | 2/2009 | Kim et al. | |
| 2009/0047968 A1 | 2/2009 | Gunnarsson et al. | |
| 2009/0075648 A1* | 3/2009 | Reed et al. | 455/424 |
| 2009/0075655 A1 | 3/2009 | Dobson et al. | |
| 2009/0112932 A1 | 4/2009 | Skierkowski et al. | |
| 2009/0131038 A1 | 5/2009 | MacNaughtan et al. | |
| 2009/0163223 A1 | 6/2009 | Casey | |
| 2009/0221297 A1 | 9/2009 | Wengerter et al. | |
| 2009/0227261 A1 | 9/2009 | Tiirola et al. | |
| 2009/0233625 A1 | 9/2009 | Ferguson | |
| 2009/0257353 A1* | 10/2009 | Song et al. | 370/241 |
| 2009/0264130 A1 | 10/2009 | Catovic et al. | |
| 2009/0312022 A1 | 12/2009 | Viorel et al. | |
| 2009/0315796 A1 | 12/2009 | Reichl et al. | |
| 2009/0323530 A1* | 12/2009 | Trigui et al. | 370/235 |
| 2010/0002603 A1* | 1/2010 | Gupta et al. | 370/254 |
| 2010/0008293 A1 | 1/2010 | Gupta et al. | |
| 2010/0029282 A1 | 2/2010 | Stamoulis et al. | |
| 2010/0046369 A1 | 2/2010 | Zhao et al. | |
| 2010/0075682 A1 | 3/2010 | del Rio-Romero | |
| 2010/0103911 A1 | 4/2010 | Ji | |
| 2010/0111013 A1 | 5/2010 | Chou | |
| 2010/0111047 A1 | 5/2010 | Yang et al. | |
| 2010/0112996 A1 | 5/2010 | Ho et al. | |
| 2010/0124934 A1 | 5/2010 | Mach | |
| 2010/0130194 A1 | 5/2010 | Dickey | |
| 2010/0149984 A1 | 6/2010 | Kapoor et al. | |
| 2010/0159936 A1 | 6/2010 | Brisebois et al. | |
| 2010/0169934 A1 | 7/2010 | Kennedy | |
| 2010/0190488 A1 | 7/2010 | Jung et al. | |
| 2010/0203881 A1 | 8/2010 | del Rio Romero et al. | |
| 2010/0214939 A1 | 8/2010 | Ryan | |
| 2010/0216453 A1 | 8/2010 | Kallin et al. | |
| 2010/0216467 A1 | 8/2010 | Ryan et al. | |
| 2010/0216477 A1 | 8/2010 | Ryan | |

(56) References Cited

U.S. PATENT DOCUMENTS

| | | |
|---|---|---|
| 2010/0232318 A1 | 9/2010 | Sarkar |
| 2010/0235285 A1 | 9/2010 | Hoffberg |
| 2010/0254344 A1 | 10/2010 | Wei et al. |
| 2010/0267397 A1 | 10/2010 | Shen et al. |
| 2010/0278161 A1 | 11/2010 | Ore et al. |
| 2010/0284303 A1* | 11/2010 | Catovic et al. ............... 370/254 |
| 2010/0299419 A1 | 11/2010 | Ramankutty et al. |
| 2010/0302954 A1 | 12/2010 | Tirpak et al. |
| 2010/0303174 A1 | 12/2010 | Oh et al. |
| 2010/0309799 A1* | 12/2010 | Nunzi et al. ................. 370/252 |
| 2010/0311415 A1 | 12/2010 | Hamabe et al. |
| 2010/0311421 A1 | 12/2010 | Mach |
| 2010/0325267 A1 | 12/2010 | Mishra et al. |
| 2010/0327766 A1 | 12/2010 | Recker et al. |
| 2011/0009105 A1 | 1/2011 | Lee et al. |
| 2011/0014925 A1 | 1/2011 | Antic et al. |
| 2011/0028144 A1 | 2/2011 | Catovic et al. |
| 2011/0034179 A1 | 2/2011 | David et al. |
| 2011/0044165 A1 | 2/2011 | Ni et al. |
| 2011/0045865 A1 | 2/2011 | Viering et al. |
| 2011/0059744 A1 | 3/2011 | Won et al. |
| 2011/0090820 A1* | 4/2011 | Hussein et al. ............... 370/255 |
| 2011/0092195 A1* | 4/2011 | Hussein et al. ............... 455/418 |
| 2011/0096687 A1 | 4/2011 | Dottling et al. |
| 2011/0096688 A1 | 4/2011 | Sachs et al. |
| 2011/0105139 A1 | 5/2011 | On |
| 2011/0111700 A1 | 5/2011 | Hackett |
| 2011/0130135 A1 | 6/2011 | Trigui |
| 2011/0130146 A1 | 6/2011 | Trigui |
| 2011/0136478 A1 | 6/2011 | Trigui |
| 2011/0141972 A1 | 6/2011 | Oh et al. |
| 2011/0151881 A1 | 6/2011 | Chou et al. |
| 2011/0190016 A1 | 8/2011 | Hamabe et al. |
| 2011/0199985 A1 | 8/2011 | Cai et al. |
| 2011/0230222 A1 | 9/2011 | Reudink |
| 2011/0252477 A1 | 10/2011 | Sridhar et al. |
| 2011/0280157 A1 | 11/2011 | Suerbaum |
| 2011/0294527 A1 | 12/2011 | Brueck et al. |
| 2011/0312335 A1 | 12/2011 | Liu et al. |
| 2012/0009912 A1 | 1/2012 | Wang et al. |
| 2012/0009938 A1 | 1/2012 | Liu et al. |
| 2012/0009948 A1 | 1/2012 | Powers et al. |
| 2012/0026918 A1 | 2/2012 | Won et al. |
| 2012/0026941 A1 | 2/2012 | Ahmad et al. |
| 2012/0028584 A1 | 2/2012 | Zhang et al. |
| 2012/0028664 A1 | 2/2012 | Zhang et al. |
| 2012/0034919 A1 | 2/2012 | Nakata et al. |
| 2012/0066377 A1 | 3/2012 | Li et al. |
| 2012/0087257 A1 | 4/2012 | Larsson et al. |
| 2012/0087269 A1 | 4/2012 | Hussein et al. |
| 2012/0147765 A1 | 6/2012 | Wigren |
| 2012/0147828 A1 | 6/2012 | Wigren |
| 2012/0170478 A1 | 7/2012 | Doettling et al. |
| 2012/0182874 A1 | 7/2012 | Siomina et al. |
| 2012/0252479 A1 | 10/2012 | Morita et al. |
| 2012/0264470 A1 | 10/2012 | Bajj et al. |
| 2012/0270536 A1 | 10/2012 | Ratasuk et al. |
| 2012/0295609 A1 | 11/2012 | Li et al. |
| 2012/0327797 A1 | 12/2012 | Siomina et al. |
| 2013/0028107 A1 | 1/2013 | Ho et al. |
| 2013/0196650 A1 | 8/2013 | Futaki |
| 2013/0217435 A1 | 8/2013 | Tarraf et al. |
| 2013/0229914 A1 | 9/2013 | Suerbaum |
| 2013/0242736 A1 | 9/2013 | Tarraf et al. |
| 2013/0322395 A1 | 12/2013 | Kazmi et al. |
| 2015/0011197 A1 | 1/2015 | Tarraf et al. |

FOREIGN PATENT DOCUMENTS

| | | |
|---|---|---|
| WO | WO 2007/063426 A2 | 6/2007 |
| WO | WO 2010132884 | 11/2010 |
| WO | WO 2011005524 | 1/2011 |
| WO | WO 2011046705 | 4/2011 |
| WO | WO 2012/072445 | 6/2012 |

OTHER PUBLICATIONS

U.S. Office Action mailed Oct. 13, 2010 for U.S. Appl. No. 12/385,752, filed Apr. 17, 2009.
U.S. Office Action mailed May 5, 2011 for U.S. Appl. No. 12/385,752, filed Apr. 17, 2009.
International Search Report and Written Opinion mailed Nov. 24, 2010 for PCT Application No. PCT/US2010/050627.
International Search Report and Written Opinion mailed Nov. 15, 2010 for PCT Application No. PCT/US2010/048929.
U.S. Office Action mailed Dec. 22, 2011 for U.S. Appl. No. 12/718,189, filed Mar. 5, 2010.
U.S. Office Action mailed Dec. 29, 2011 for U.S. Appl. No. 12/634,057, filed Dec. 9, 2009.
International Search Report and Written Opinion mailed Nov. 3, 2010 for PCT Application No. PCT/US2010/048927.
Amirijoo et al., "Cell Outage Management in LTE Networks," COST 2100 TD(9)941, Vienna, Austria, Sep. 28-30, 2009.
Mueller et al., "A Cell Outage Detection Algorithm Using Neighbor Cell List Reports" 2008.
U.S. Office Action mailed Feb. 27, 2012 for U.S. Appl. No. 12/385,752, filed Apr. 17, 2009.
U.S. Office Action mailed Jun. 6, 2012 for U.S. Appl. No. 12/634,057, filed Dec. 9, 2009.
U.S. Final Office Action mailed Jul. 13, 2012 for U.S. Appl. No. 12/385,752, filed Apr. 17, 2009.
U.S. Final Office Action mailed Aug. 29, 2012 for U.S. Appl. No. 12/718,189, filed Mar. 5, 2010.
International Search Report and Written Opinion mailed Nov. 5, 2012 for PCT Application No. PCT/US2012/054204.
"Self-Optimizing Networks: The Benefits of SON in LTE," 4G americas, Jul. 2011.
International Search Report and Written Opinion mailed Feb. 5, 2013 for PCT Application No. PCT/US2012/064131.
U.S. Office Action mailed Mar. 18, 2013 for U.S. Appl. No. 12/580,604, filed Oct. 16, 2009.
Lehtimaki et al., "A SOM Based Approach for Visualization of GSM Network Performance Data," Helsinki University of Technology, 2005.
Blume et al., "Energy Savings in Mobile Networks Based on Adaptation to Traffic Statistics," Bell Labs Technical Journal 15(2), 77-94 (2010) © 2010 Alcatel-Lucent.
European Search Report for European Appln. No. 12829986; issued Jun. 2, 2015.
Feng et al., "Self-Organizing Networks (SON) in 3Gpp Long Term Evolution" Nomore Research GmbH (2008).
Office Action for U.S. Appl. No. 12/580,604, mailed Dec. 3, 2012.
Office Action for U.S. Appl. No. 12/718,189, mailed Jul. 31, 2014.
Office Action for U.S. Appl. No. 12/718,189, mailed Jan. 16, 2014.
Office Action for U.S. Appl. No. 13/273,354, mailed Apr. 16, 2013.
International Search Report and Written Opinion for International Application No. PCT/US2012/038243, mailed Aug. 17, 2012.
Office Action for U.S. Appl. No. 13/606,528, mailed Oct. 9, 2014.
International Search Report and Written Opinion for International Application No. PCT/US2013/026102, mailed Apr. 29, 2013.
Office Action for U.S. Appl. No. 12/718,189, mailed Jul. 6, 2015.
Office Action for U.S. Appl. No. 13/606,528, mailed Jul. 16, 2015.

* cited by examiner

```
Receive, at a first time, a first set of performance indicators of at
least one cell for a first instance of a set of time periods.
402
```

```
Define a first recurring schedule set including at least two time
periods from the set of time periods, each time period from the
recurring schedule set is associated with at least one performance
indicator (1) from the first set of performance indicators and (2)
within a predefined range of at least one performance indicator from
the first set of performance indicators and associated with the
remaining time periods from the first recurring schedule set.
404
```

```
Send, to a SON process module at a second time after the first
time, an indication of the first recurring schedule set such that the
SON process module performs a SON process for the at least one
cell during each time period (1) from the first recurring schedule set
and (2) from a second instance of the set of time periods.
406
```

```
Receive, at a third time after the second time, a second set of
performance indicators of the at least one cell for the second
instance of the set of time periods.
408
```

```
Modify the first recurring schedule set based on the second set of
performance indicators to define a second recurring schedule set.
410
```

FIG. 4

METHODS AND APPARATUS FOR PARTITIONING WIRELESS NETWORK CELLS INTO TIME-BASED CLUSTERS

CROSS-REFERENCE TO RELATED APPLICATIONS

This application claims priority to and the benefit of U.S. Provisional Patent Application No. 61/557,147, filed Nov. 8, 2011, and entitled "Pattern Recognition and Learning Based Self Optimizing Networks," which is incorporated herein by reference in its entirety.

BACKGROUND

Some embodiments described herein relate generally to Self Optimizing Networks (SON), and, in particular, to methods and apparatus for partitioning wireless SON cells into time-based clusters.

Some known wireless networks implement an automated system for network optimization using SON solutions (e.g., SON products and processes), which adjust radio resources and network parameters to improve the overall network performance. Such SON solutions typically target different response times for various network performance indicators. Cells of such wireless networks, however, are typically optimized individually without being clustered based on characteristics (e.g., time-based traffic pattern) of the network performance indicators. Thus, the SON solutions used for optimization of the known wireless networks are typically not customized specifically for such clusters.

Accordingly, a need exists for methods and apparatus for partitioning wireless network cells into clusters and implementing SON solutions customized for such clusters, to further improve or maximize the overall network performance for the wireless networks.

SUMMARY

In some embodiments, an apparatus includes a cluster partitioning module and an optimization module. The cluster partitioning module receives a first performance indicator set for a first instance of a time period set. The cluster partitioning module defines a recurring schedule set, where each time period from the recurring schedule set is associated with a performance indicator from the first performance indicator set and within a predefined range of a performance indicator associated with the remaining time periods from the recurring schedule set. The optimization module receives a second performance indicator set for a second instance of the time period set. The optimization module defines a metric value based on the second performance indicator set, and causes a change in a network implementation based on the metric value at each time period from a third instance of the time period set and from the recurring schedule set.

DETAILED DESCRIPTION

In some embodiments, a system includes a cluster partitioning module and an optimization module. The cluster partitioning module or the optimization module is implemented in at least a memory or a processing device. At a first time, the cluster partitioning module is configured to receive a first set of performance indicators of at least one cell of a network for a first instance of a set of time periods. The cluster partitioning module is then configured to define a recurring schedule set including at least two time periods from the set of time periods. Each time period from the recurring schedule set is associated with at least one performance indicator from the first set of performance indicators, which is within a predefined range of at least one performance indicator from the first set of performance indicators that is associated with the remaining time periods from the recurring schedule set.

At a second time after the first time, the optimization module is configured to receive a second set of performance indicators of the at least one cell for a second instance of the set of time periods. The optimization module is then configured to define a metric value associated with the recurring schedule set based on each performance indicator from the second set of performance indicators that is associated with a time period from the recurring schedule set. The optimization module is further configured to send the metric value to at least one network element associated with the at least one cell. As a result, the network element changes an implementation of the network based on the metric value at each time period from a third instance of the set of time periods that is included in the recurring schedule set, when the metric value is associated with a network configuration change.

In some instances, the optimization module is, for example, an antenna-based SON process module, a parameter-based SON process module, or a combined antenna- and parameter-based SON process module. In some instances, the optimization module can be one of, for example, a load balancing SON process module, a co-channel interference SON process module, a neighbor list SON process module, a handover optimization SON process module, or a self-healing SON process module. The SON processes executed at the optimization module can be similar to the SON processes shown and described in U.S. Patent Application Publication No. 2011/0090820, filed Oct. 16, 2009 and entitled "Self-Optimizing Wireless Network," which is incorporated herein by reference in its entirety. Additionally, in some instances, the metric value is associated with, for example, a tilt of an antenna of a network element.

In some embodiments, a non-transitory processor-readable medium stores code representing instructions to be executed by a processor. The code stored in the medium includes code to cause the processor to receive, at a first time, a first set of performance indicators of at least one cell for a first instance of a set of time periods. The code stored in the medium includes code to cause the processor to define a first recurring schedule set including at least two time periods from the set of time periods. Each time period from the recurring schedule set is associated with at least one performance indicator from the first set of performance indicators that is within a predefined range of at least one performance indicator from the first set of performance indicators and associated with the remaining time periods from the first recurring schedule set. The code stored in the medium also includes code to cause the processor to send an indication of the first recurring schedule set to a SON process module at a second time after the first time. As a result, the SON process module performs a SON process for the at least one cell during each time period from a second instance of the set of time periods that is included in the first recurring schedule set. Moreover, the code stored in the medium includes code to cause the processor to receive, at a third time after the second time, a second set of performance indicators of the at least one cell for the second instance of the set of time periods. The code stored in the medium further includes code to cause the processor to modify the first recurring schedule set based on the second set of performance indicators to define a second recurring schedule set.

As used herein, a module can be, for example, any assembly and/or set of operatively-coupled electrical components, and can include, for example, a memory, a processor, electrical traces, optical connectors, software (executing in hardware) and/or the like. As used herein, the singular forms "a," "an" and "the" include plural referents unless the context clearly dictates otherwise. Thus, for example, the term "a network optimization device" is intended to mean a single network optimization device or a combination of network optimization devices.

Figure 1:
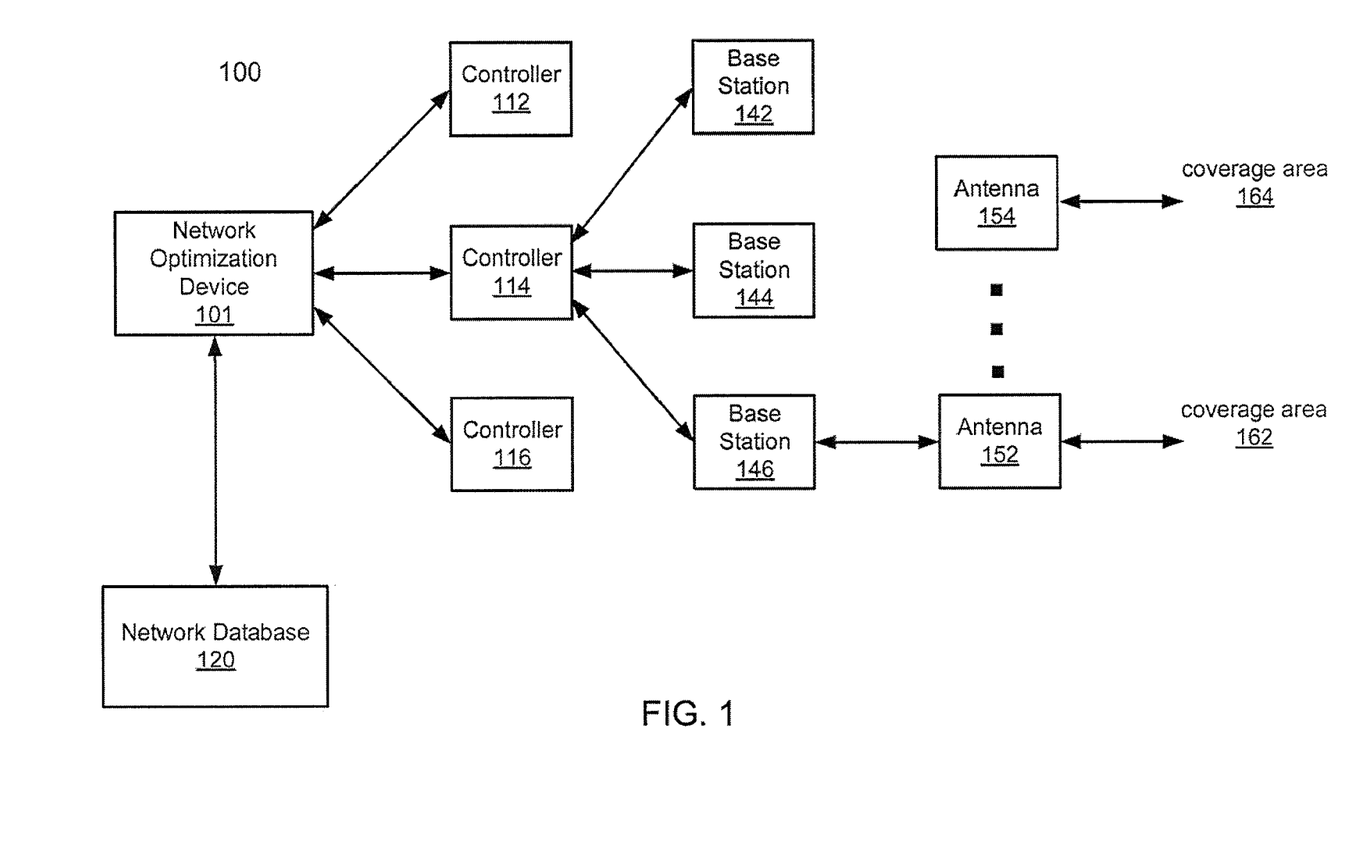
FIG. 1 is a schematic diagram that illustrates a wireless network configured to implement a network optimization device, according to an embodiment.

FIG. 1 is a schematic diagram that illustrates a wireless network 100 configured to implement a network optimization device 101, according to an embodiment. The wireless network 100 can be similar to the wireless networks shown and described in U.S. Patent Application Publication No. 2009/0323530, filed Apr. 17, 2009 and entitled "Dynamic Load Balancing," and U.S. Patent Application Publication No. 2011/0090820, filed Oct. 16, 2009 and entitled "Self-Optimizing Wireless Network," each of which is incorporated herein by reference in its entirety.

Specifically, the wireless network 100 can be any network that enables wireless communication devices (e.g., cellular phones, Wi-Fi enabled laptops, Bluetooth devices, mobile devices, etc.) to communicate with each other. In some embodiments, the wireless network 100 can be implemented and administered using a wireless transmission system such as radio frequency (RF) waves. For example, the wireless network 100 can be a cellular network that enables two cellular phones to communicate with each other. For another example, the wireless network 100 can be a Wi-Fi network that enables multiple Wi-Fi enabled laptops to be operatively connected. In some embodiments, the wireless network 100 can be at least a portion of, for example, a wireless local area network (WLAN), a wireless mesh network, a wireless metropolitan area network (MAN), a wireless wide area network (WAN), a mobile device network (e.g., a global system for mobile communications (GSM) network, a personal communications service (PCS) network), a radio access network (RAN), a long term evolution (LTE) network, a Universal Mobile Telecommunications System (UMTS) network, and/or the like.

As shown in FIG. 1, the wireless network 100 includes a network optimization device 101 operatively coupled to a network database 120. The network optimization device 101 is also operatively coupled to and configured to manage one or more controllers (e.g., controllers 112, 114 and 116). Each controller (e.g., the controller 114) is operatively coupled to and configured to manage one or more network elements such as base stations (e.g., base stations 142, 144 and 146). A controller can be any device that is capable of sending control signals (e.g., commands, instructions, requests, etc.) to the network element(s) controlled by that controller, thus managing operations of the network element(s). In some embodiments, a controller can be, for example, a server or similar computer device. In some embodiments, a controller can also be considered as a network element of the wireless network 100.

A network element (e.g., base station 142, 144, 146) controlled by a controller can be any device or infrastructure that can be wirelessly coupled to and communicate with one or more wireless communication devices (e.g., subscribers to the wireless network 100). In some embodiments, such a network element (e.g., base station 146) can be equipped with and configured to control one or more antennas (e.g., the antennas 152 and 154), which can be used to support data communications (e.g., transmit data to and/or receive data from) between the network element and the wireless communication devices that are distributed throughout a coverage area (i.e., sector) associated with that antenna. For example, as shown in FIG. 1, the antenna 152 is used to support data communications between the base station 146 and wireless communication devices distributed within the coverage area 162; the antenna 154 is used to support data communications between a base station where the antenna 154 is located and wireless communication devices distributed within the coverage area 164. In some embodiments, a network element (e.g., base station) controlled by a controller can be located at, for example, a cell site. In such embodiments, the coverage area associated with an antenna of that network element can be referred to as a cell.

In some embodiments, the connections between the network optimization device 101 and the one or more controllers (e.g., the controllers 112, 114 and 116) and the network database 120 can include, for example, a wireless connection, a wired connection, and/or a combination of wireless and wired connections. Similarly, the connections between each controller (e.g., the controller 114) and its associated network element(s) (e.g., the base stations 142, 144 and 146) can include, for example, a wireless connection, a wired connection and/or a combination of wireless and wired connections.

The network database 120 can be implemented in a memory or other storage device that is part of the network optimization device 101 or another device operatively coupled to the network optimization device 101. The network database 120 can be configured to receive and store information and/or data associated with the wireless network 100, such as network statistics, current network configurations, and performance indicators of the wireless network 100. Furthermore, the network database 120 can be configured to provide the stored information and/or data to the network optimization device 101. The information and/or data can be used at the network optimization device 101 to assist in partitioning cells of the wireless network 100 into clusters and improving/optimizing SON processes operated in the wireless network 100 based on the clusters, as described in details with respect to FIGS. 2-4. While shown in FIG. 1 as being located on a single device, in some embodiments, the functionality of the network database 120 can be distributed to multiple devices (e.g., multiple databases) across the wireless network 100.

The information and/or data provided from the network database 120 to the network optimization device 101 can include, for example, a set of values and/or indicators that can be used to determine the performance of one or more cells of the wireless network 100 in various aspects. The set of values and/or indicators can include, for example, network capacity statistics (e.g., total number of calls, an amount of delivered data in bits, a throughput measured in overall data rate), Key Performance Indicators (KPIs), mobile level measurements, cell level measurements, system level measurements, network metric values, configuration metrics (e.g., system configuration metrics, device configuration metrics), power indicators, indications of a network alarm, and/or the like.

In some embodiments, the KPIs provided from the network database 120 to the network optimization device 101 can include, for example, a neighbor list, a dropped call rate (i.e., the ratio between failed calls and a total number of calls requested), a transmitted radio power, traffic statistical values associated with a cell, total average transmitted power (e.g., in dBm), uplink total noise (e.g., in dBm), downlink/uplink load factor (e.g., in percentage), uplink interference noise rise (e.g., in dB), number of downlink/uplink radio links used, connection success rate (e.g., in percentage), average number of attempted users, average number of connected users, average number of used codes, number of handovers of end-user equipments, ratio of handoff (e.g., in percentage), connection success, downlink/uplink throughput (e.g., in kbps), etc. In some embodiments, the KPIs can include cell level KPIs (e.g., statistics associated with handover and neighbor list as listed above), user equipment level KPIs (e.g., a signal strength indicator for a wireless communication device), as well as system level KPIs (e.g., number of connected users across the network).

The network optimization device 101 can be any device configured to control and/or coordinate one or more optimization processes (e.g., hardware processes and/or software processes executed in hardware) for performing optimization of network parameters in the wireless network 100. In some embodiments, the network optimization device 101 can be, for example, a compute device, a server device, an application server, a mobile device, a workstation, and/or the like. As shown in FIG. 1, the network optimization device 101 can be directly or operatively coupled to the remaining devices within the wireless network 100. Specifically, the network optimization device 101 can be operatively coupled to the network elements (e.g., the base stations 142, 144 and 146) via one or multiple intermediate modules and/or devices such as, for example, a controller (e.g., the controllers 112, 114 and 116) and/or the like. In some embodiments, the network optimization device 101 can be coupled to the remaining devices of the wireless network 100 via any suitable connecting mechanism such as, for example, optical connections (e.g., optical cables and optical connectors), electrical connections (e.g., electrical cables and electrical connectors), wireless connections (e.g., wireless transceivers and antennas), and/or the like. Furthermore, while shown in FIG. 1 as a single device, in some embodiments, the functionality of the network optimization device 101 can be distributed to multiple devices across the wireless network 100.

Figure 2:
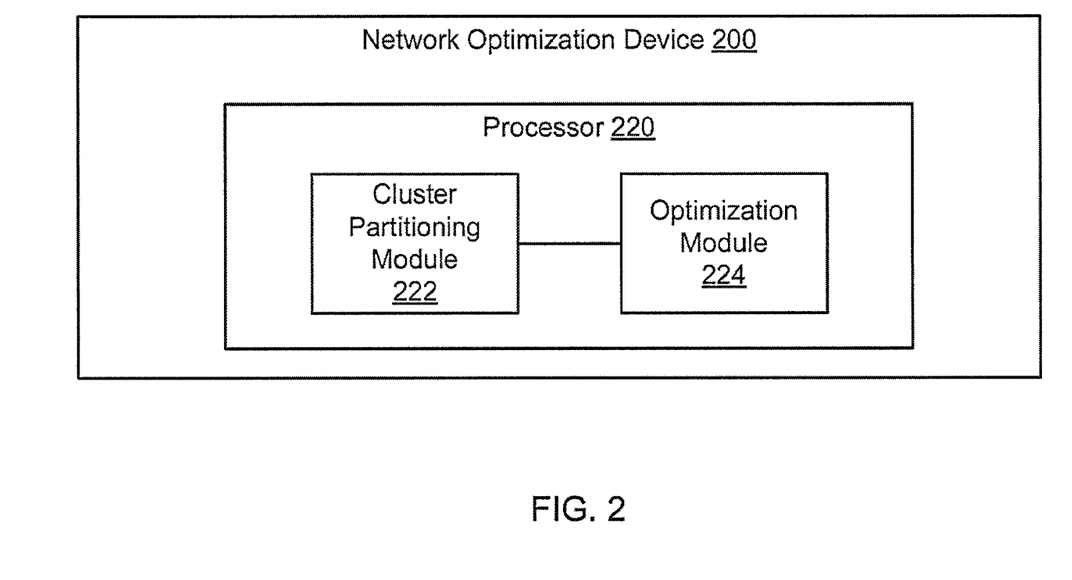
FIG. 2 is a block diagram of a processor of a network optimization device, according to an embodiment.

In some embodiments, the optimization process(es) for performing optimization of network parameters in the wireless network 100 can be executed at a processor of the network optimization device 101. FIG. 2 is a block diagram of a processor 220 of a network optimization device 200, which is structurally and functionally similar to the network optimization device 101 in FIG. 1. Furthermore, the network optimization device 200 can be included in a wireless network similar to the wireless network 100 in FIG. 1. Although not shown in FIG. 2, the network optimization device 200 can include other components such as a memory, a series of communication ports, and/or the like. In some embodiments, the network optimization device 200 can be a single physical device. In other embodiments, the network optimization device 200 can include multiple physical devices, each of which can include one or multiple modules (shown in FIG. 2) and/or other components (not shown in FIG. 2) of the processor 220.

As shown in FIG. 2, the processor 220 includes a cluster partitioning module 222 and an optimization module 224. Although not shown in FIG. 2, in some embodiments, the processor 220 can include other modules and/or components associated with performing the optimization process such as, for example, a monitor module (monitoring performance of network elements controlled by the network optimization 200), a detector module (detecting any malfunction or other problem at network elements controlled by the network optimization 200), a communication module (transmitting control signals to and/or receiving data from network elements controlled by the network optimization 200), and/or the like. Each module in the processor 220 can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor 220) capable of performing one or more specific functions associated with that module. The processor 220 can be any suitable processor configured to run and/or execute those modules.

The cluster partitioning module 222 can be configured to partition cells of the wireless network into clusters based on performance indicators (e.g., KPIs) collected from network elements (e.g., base stations similar to the base stations 142, 144 and 146 in FIG. 1) of the wireless networks. In some embodiments, the cluster partitioning module 222 can be configured to receive the performance indicators from a network database operatively coupled to the network optimization device 200, which is similar to the network database 120 in FIG. 1. In some other embodiments, the cluster partitioning module 222 can be configured to receive the performance indicators from the network elements of the wireless network. The performance indicators received at the cluster partitioning module 222 can include performance indicators associated with resolving optimization issues such as load balancing, coverage optimization, capacity optimization, interference reduction, self healing, etc., and/or configuration parameters pertaining to these performance indicators.

In some embodiments, in addition to the performance indicators, the cluster partitioning module 222 can be configured to receive characteristic patterns associated with the received performance indicators. Such characteristic patterns can be identified, based on performance indicators previously collected from the network elements, by a pattern recognition process that is executed at a device (e.g., a device hosting the network database) operatively coupled to the network optimization device 200. Specifically, the characteristic patterns can be identified based on a relationship between network elements exhibiting values of the performance indicators that are the same or similar as defined by the pattern recognition process. In some other embodiments, such a pattern recognition process can be executed at the network optimization device 200 based on the performance indicators received at the network optimization device 200.

Based on the received performance indicators and characteristic patterns, the cluster partitioning module 222 can be configured to partition the network elements (or equivalently, the cells associated with the network elements) into clusters. The clustering can be based on any unit of time and/or space in which the performance indicators with the same or similar values can be grouped together according to certain thresholds based on the characteristic patterns. Such thresholds can be, for example, a throughput in a unit of time, an average transmission rate, a total number of dropped calls during a time period, etc. In some embodiments, for example, the clusters can be based on time of day (e.g., 3 PM to 4 PM), day of week (e.g., Tuesday), season in the year (e.g., summer), geographical areas, morphological areas, population density contours, and/or the like.

In some embodiments, cluster partitioning can be based on a combination of time and space considerations. That is, a cluster can include a set of network elements (or equivalently, a set of cells associated with those network elements), each of which is associated with a specific geographic location and a specific time period. For example, a first cluster can include a first base station at a first geographic location for a first time period (e.g., 3 PM to 4 PM of a day), the first base station at the first geographic location for a second time period (e.g., 6 PM to 7 PM of a day) different from the first time period, and a second base station at a second geographic location (different from the first geographic location) for the first time period; a second cluster can include the first base station at the first geographic location for the second time period, and the second network element at the second geographic location for the second time period. Thus, a network element (or equivalently, a cell associated with that network element) can be included in one cluster for a given time period and another cluster for a different time period.

In some embodiments, clusters can include mutually exclusive network elements or overlapping network elements. In some embodiments, network elements that do not specifically fit in and/or follow a specific characteristic pattern of a cluster can be included in that cluster. For example, a neighbor network element (e.g., an immediately-adjacent neighbor network element, a network element within a distance, etc.) of a network element having the specific characteristic pattern can be included in the cluster. For another example, a neighbor network element of a network element having a problem can be included in a common cluster of network elements with that problem. Such a cluster can be used to monitor the performance of a region and/or to help reduce/minimize any negative effects on a region that a SON process can cause by making changes to the cluster.

In some embodiments, clusters can include mutually exclusive time periods or overlapping time periods. In some embodiments, time periods that do not specifically fit in and/or follow the characteristic pattern of a cluster can be included in that cluster. For example, a preceding time period and/or a time period following (e.g., a time period immediately preceding or following the time period exhibiting a characteristic pattern, a time period within a time range of the time period exhibiting a characteristic pattern, etc.) a time period having the characteristic pattern can be included in the cluster. In such an example, if the characteristic pattern is detected for a time period, a cluster can be defined to include an amount of time before and/or after the time period along with the time period. This can help to avoid or minimize any negative effects a SON process my cause on other time periods near the time period exhibiting the characteristic pattern.

In some embodiments, cluster partitions can include a single boundary. A group of sub-clusters can be defined within a cluster. The clusters can be dynamic with respect to space, network elements, and/or time, frequency or period of the characteristic patterns. Specifically, after the initial establishment of cluster partitions based on the received performance indicators and characteristic patterns, the cluster partitioning module 222 can be configured to continue refining the cluster partitions based on ongoing collection of performance indicators and/or characteristic patterns. For example, network elements can be added to and/or removed from a cluster based on changing performance indicators and/or characteristic patterns. Similarly, additional time periods, geographic areas and/or network elements can be added to and/or removed from a cluster based on changing performance indicators and/or characteristic patterns. For another example, a cluster can be split into two or more smaller clusters or can be merged with another cluster based on changing performance indicators and/or characteristic patterns.

After partitioning cells into clusters, the cluster partitioning module 222 can be configured to define one or more recurring schedule sets for the network elements of the wireless network based on the partitioned clusters. In some embodiments, the cluster partitioning module 222 can be configured to define a recurring schedule set for each cluster. Such a recurring schedule set defined for a cluster includes at least one set of time periods that recur periodically based on the characteristic pattern of that cluster. In some embodiments, as discussed above, network elements with the same or similar performance indicators in a set of time periods can be included in a cluster. As a result, the recurring schedule set defined for that cluster can include time periods from that set of time periods, where each time period within the recurring schedule set is associated with the same or similar performance indicator for a network element with the performance indicators for the same or other network elements associated with the remaining time periods within the recurring schedule set. In other words, each time period included in the recurring schedule set defined for the cluster is associated with a performance indicator within a predefined range of the performance indicators associated with the remaining time periods from the recurring schedule set.

For example, the cluster partitioning module 222 can define a first recurring schedule set for the first cluster illustrated above to include the first time period (e.g., 3 PM to 4 PM of a day) for the first base station, the first time period for the second base station, and the second time period (e.g., 6 PM to 7 PM of a day) for the first base station, where each time period (associated with a network element) within the first recurring schedule set is associated with a dropped call rate within a predefined range (e.g., between 10% and 12%). Similarly, the cluster partitioning module 222 can define a second recurring schedule set for the second cluster illustrated above to include the second time period for the first base station and the second time period for the second base station, where each time period (associated with a network element) within the second recurring schedule set is associated with throughput within a predefined range (e.g., between 10 kbits/s and 12 kbits/s).

In some embodiments, the cluster partitioning module 222 can define a recurring schedule set with certain limitations or constraints. For example, a recurring schedule set can include one hour from 3 PM to 4 PM in each day in October only. For another example, a recurring schedule set can include two hours from 7 AM to 8 AM and from 6 PM to 7 PM in each day for the next 10 days only. In some embodiments, the cluster partitioning module 222 can be configured to define more than one recurring schedule set for a cluster, where one recurring schedule set is nested within another recurring schedule set. For example, a combined recurring schedule set for a cluster can include one hour from 3 PM to 4 PM (as an inner recurring schedule set) in every Monday (as an outer recurring schedule set). For another example, another combined recurring schedule set for a cluster can include each Tuesday and Friday (as an inner recurring schedule set) in each March and October every year (as an outer recurring schedule set). In some embodiments, the cluster partitioning module 222 can be configured to define more than two recurring schedule sets, where one recurring schedule set is nested within another. An example of recurring schedule sets is illustrated and described with respect to FIG. 3 below.

After defining the recurring schedule set(s), the cluster partitioning module 222 can be configured to send the defined recurring schedule set to the optimization module 224. The optimization module 224 can be configured to execute one or more optimization processes (e.g., SON processes) for the partitioned clusters. In some embodiments, the optimization module 224 can perform a learning-based parameter setting process and a pattern-based SON operation process. In such embodiments, although not shown in FIG. 2, the optimization module 224 can include more than one sub-module such as, for example, a learning-based parameter setting sub-module and a pattern-based SON operation sub-module, each of which can be configured to perform the corresponding function as described below.

The optimization module 224 (or the learning-based parameter setting sub-module of the optimization module 224) can be configured to learn optimal and/or improved parameter setting for network elements in the partitioned clusters. In some embodiments, similar to the cluster partitioning module 222, the optimization module 224 can receive performance indicators and/or characteristic patterns associated with the network elements of a cluster. Such performance indicators and characteristic patterns can be collected or identified according to the recurring schedule set defined for that cluster. For example, only the performance indicators during the time periods from the recurring schedule set are collected from the network elements in the cluster and used at the optimization module 224.

The optimization module 224 (or the learning-based parameter setting sub-module of the optimization module 224) can then be configured to learn and/or determine optimal and/or improved parameter settings for the partitioned clusters. In some instances, the optimization module 224 can be configured to determine a set of optimal and/or improved parameter setting for each partitioned cluster. If the cluster partitions are based on a combination of time and space boundaries, the parameter settings for the corresponding cluster can change based on both the location of the network elements and the time periods associated with the network elements that are included in the cluster. Subsequently, as described below with the pattern-based SON operation sub-module, the optimization module 224 can apply the optimal and/or improved parameter settings to the corresponding network elements of the clusters. Additionally, after initially learning or determining the optimal and/or improved parameter setting of network elements in a cluster based on received performance indicators and characteristic patterns, in some instances, the optimization module 224 can be configured to continuously refine the parameter setting based on ongoing collection of performances and characteristic patterns.

In some embodiments, the time based clusters and time based cluster parameter settings can follow a nested routine. Specifically, parameter settings of time based clusters changing more frequently can be executed more frequently and parameter settings of clusters changing less frequently can be superimposed on the current parameter settings. For example, a change in a parameter setting of a first network element in a cluster as a result of the cluster entering a new characteristic pattern based on time and/or space can be applied to the first network element, while a parameter setting of a second network element in the same cluster not affected by the new characteristic pattern can remain unchanged. For example, the cluster partition of network elements during the days in spring may be different from the cluster partition of network elements during the days in fall. Additionally, the parameter settings for the network elements may change more rapidly during the day based on time-of-day clusters. On top of these changes, some additional changes in the parameter settings may occur as the season changes from spring to summer, etc. In summary, each cluster can behave dynamically with respect to the network elements within that cluster, the time periods at which that cluster is active, and the period of repetition associated with that cluster.

After the cluster partitioning and cluster parameter setting phases are completed, the optimization module 224 (or the pattern-based SON operation sub-module of the optimization module 224) can be configured to execute one or more pattern-based SON operations for the clusters based on the parameter settings determined for those clusters, as well as performance indicators that are newly collected from those clusters. In some embodiments, the pattern-based SON operations can be executed on a per-cluster basis. For example, the learning-based parameter setting determined for a cluster and a set of newly collected performance indicators for that cluster can be loaded into the pattern-based SON operation sub-module, where a SON process can be executed specifically for that cluster. As a result, the SON process can generate one or more parameter changes (e.g., metric value (s)) for the network elements of that cluster according to the recurring schedule set defined for that cluster. Subsequently, the optimization module 224 can be configured to generate and send one or more instruction signals including the parameter change(s) (e.g., metric value(s)) to the network elements of the cluster, such that the parameter change(s) can be implemented at the corresponding network elements according to the recurring schedule set defined for the cluster.

In some embodiments, for example, the SON processes executed at the optimization module 224 can be similar to the SON processes shown and described in U.S. Patent Application Publication No. 2011/0090820, filed Oct. 16, 2009 and entitled "Self-Optimizing Wireless Network," which is incorporated herein by reference in its entirety. Such SON processes can be an antenna-based SON process, a parameter-based SON process, or a combined antenna- and parameter-based SON process. Such SON processes can include, for example, a load balancing SON process, a co-channel interference SON process, a neighbor list SON process, a handover optimization SON process, a self-healing SON process, and/or the like. In some embodiments, the parameters to be changed can be a metric associated with an antenna of a network element such as a tilt of the antenna, or a parameter of other type such as a parameter used in an algorithm executed at a network element.

For example, a cluster can be identified by the cluster partitioning module 222 to include a set of 10 specific network elements from 6 AM to 10 AM. In other words, a recurring schedule set including a time period from 6 AM to 10 AM for those 10 network elements can be defined for the cluster at the cluster partitioning module 222. Then, at 6 AM, a current set of parameters for the cluster can be loaded into or implemented in the 10 network elements of the cluster. A set of performance indicators can be monitored and collected from the network elements in the cluster according to the recurring schedule (i.e., 6 AM to 10 AM). The collected performance indicators can then be sent to the optimization module 224, where a SON process can be executed based on the collected performance indicators and a parameter setting determined for that cluster at the learning-based parameter setting sub-module of the optimization module 224. As a result, if the SON process determines any changes for any parameter for the cluster, the optimization module 224 can send an instruction signal including the parameter changes to the network elements of the cluster. These changes can then be applied (loaded or implemented) at these 10 network elements according to the recurring schedule (e.g., at 6 AM in next day). As such, a round of optimization is completed for network elements of that cluster.

For another example, the SON process may also determine changes at the beginning of each hour within the time period of the recurring schedule set (e.g., at 6, 7, 8, 9, and 10 AM) for the cluster. Furthermore, at 11 AM, a parameter of a network element within the cluster can be changed dependent on another cluster's values (because 11 AM is outside the recurring schedule for the previous cluster). The next day, however, changes made at 6 AM for the cluster can be based primarily on the calculations performed, changes made, and/or observations made at 10 AM of the previous day on the cluster.

Additionally, in some embodiments, during the pattern-based SON operations, if the characteristic patterns for clusters change as a result of the operations (e.g., ongoing pattern recognition and/or classification) executed at the cluster partitioning module and/or the learning-based parameter setting module as described above, the corresponding cluster(s) can be dynamically and repeatedly redefined to reflect the modified characteristic patterns.

While shown in FIG. 2 as being included in the processor 220 of the network optimization device 200, in other embodiments, a cluster partitioning module or an optimization module can communicate with any other device of the wireless network via an application programming interface (API) of a network module and/or application, a network process, an intermediary device, and/or any other suitable means. Additionally, the cluster partitioning module can receive network information and/or data (e.g., performance indicators, characteristic patterns) from the network database or any other device in any suitable format such as, for example, text files, a file format associated with a network, and/or the like. Similarly, the optimization module can send instructions of parameter changes to network elements in any suitable means.

Figure 3:
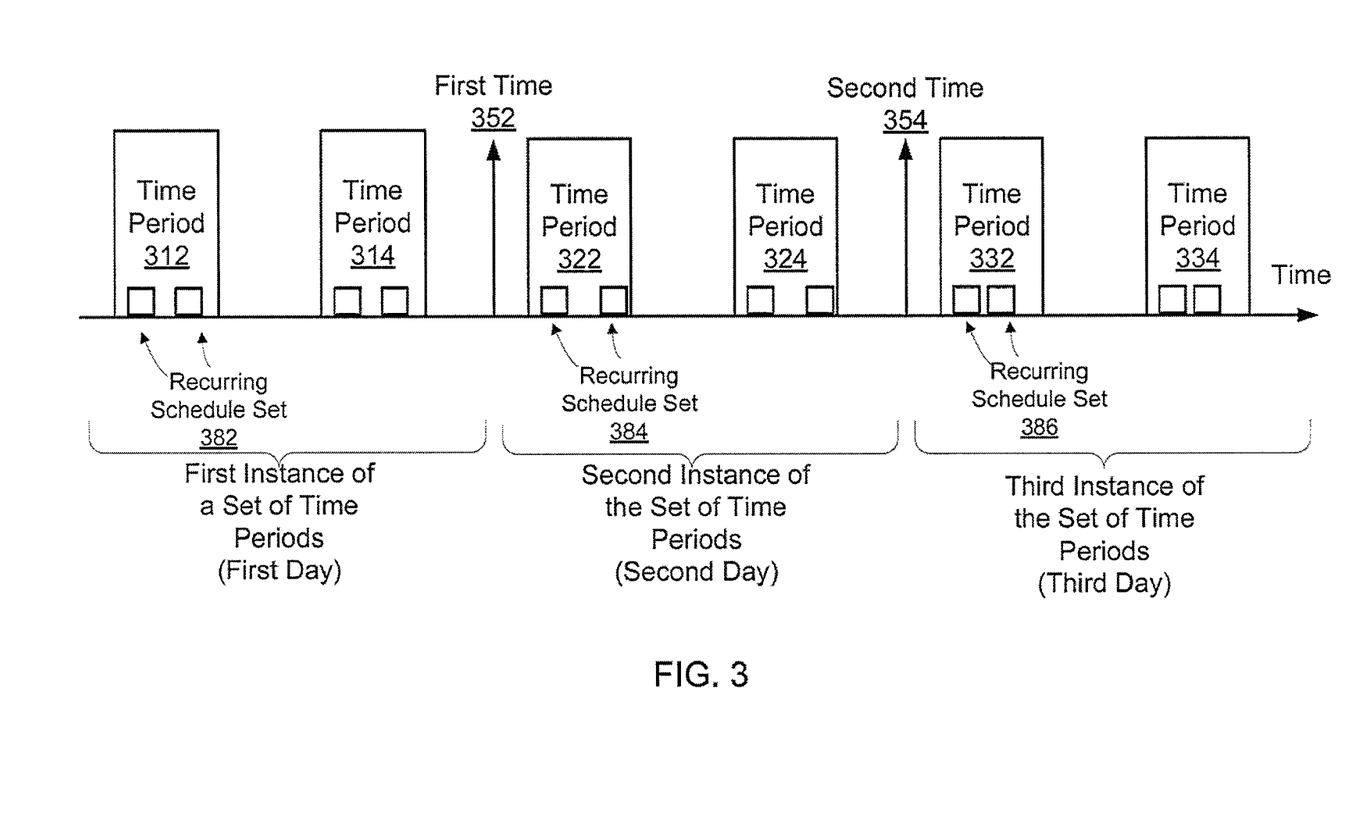
FIG. 3 is a schematic illustration of a timeline for operations of a network optimization device, according to an embodiment.

FIG. 3 is a schematic illustration of a timeline for operations of a network optimization device, which is structurally and functionally similar to the network optimization device 101 and 200 shown and described with respect to FIGS. 1 and 2. The network optimization device is within a wireless network similar to the wireless network 100 in FIG. 1, and operatively coupled to a set of network elements of the wireless network. Similar to the network optimization device 200 in FIG. 2, the network optimization device includes at least a cluster partitioning module similar to the cluster partitioning module 222 in FIG. 2 and an optimization module similar to the optimization module 224 in FIG. 2.

At the first time 352, the cluster partitioning module of the network optimization device can be configured to receive a first set of performance indicators that are collected from the network elements during time periods from a first instance of a set of time periods. As shown in FIG. 3, the first instance of the set of time periods includes at least time period 312 and time period 314. For example, the first instance of the set of time periods can include each hour (e.g., 12 AM to 1 AM, 1 AM to 2 AM, etc.) of a first day. The cluster partitioning module can be configured to receive a set of dropped call rates (e.g., 10%, 15%) for all the network elements within the wireless network, which are measured for each hour of the first day.

After receiving the first set of performance indicators, the cluster partitioning module can be configured to define a cluster based on the first set of performance indicators. Each network element at each time period from the cluster has a performance indicator that is from the first set of performance indicators and within a predefined range. As discussed above, the cluster can be a set of network elements based on both space and time. Thus, within the cluster, a network element can be associated with different time periods, and more than one network element can be associated with the same time period. For example, the predefined range can be between a dropped call rate of 10% and a dropped call rate of 12%. The cluster partitioning module can define a cluster to include a first network element during 2 AM to 3 AM that has a dropped call rate of 10%, the first network element during 5 PM to 6 PM that has a dropped call rate of 11%, a second network element during 2 AM to 3 AM that has a dropped call rate of 10.5%, etc.

Furthermore, the cluster partitioning module can be configured to define a recurring schedule set for the cluster. Such a recurring schedule set includes recurring time periods associated with network elements, which are included in the cluster. For example, the recurring schedule set can include 2 AM to 3 AM and 5 PM to 6 PM for the first network element, and 2 AM to 3 AM for the second network element, on each day after the first day.

Performance indicators of the network elements can then be monitored and collected according to the recurring schedule set. The optimization module of the network optimization device can be configured to receive the collected performance indicators. As show in FIG. 3, the time period 322 (associated with a first network element) and the time period 324 (associated with a second network element, which can be the same or different than the first network element) are included in the recurring schedule set, and also included in a second instance of the set of time periods. For example, if the recurring schedule set includes 2 AM to 3 AM and 5 PM to 6 PM for the first network element, and 2 AM to 3 AM for the second network element, then performance indicators such as the dropped call rate can be collected from the first network elements for 2 AM to 3 AM and 5 PM to 6 PM on a second day after the first day, and collected from the second network element for 2 AM to 3 AM on the second day. As shown in FIG. 3, for example, the time period 322 can represent 2 AM to 3 AM on the second day for the first network element, and the time period 324 can represent 5 PM to 6 PM on the second day for the first network element.

At the second time 354 after the first time 352, the optimization module can be configured to receive a second set of performance indicators collected according to the recurring schedule as described above. As discussed with respect to FIG. 2, the optimization module can then be configured to determine an optimal or improved parameter setting for the cluster, and then execute a SON process to define one or more metric values for the cluster based on the determined parameter setting and the second set of performance indicators. The metric value(s) are defined for parameters of the network elements of the cluster to optimize or further improve the performance of those network elements. The optimization module can be configured to send an instruction signal including the metric values to the corresponding network elements, such that the metric values can be implemented at those network elements. In some embodiments, the metric values can be implemented at the corresponding network elements according to the recurring schedule (i.e., during each time period in the future from the recurring schedule set).

For example, the optimization module can receive a set of dropped call rates including a dropped call rate of 11% for the first network element during 2 AM to 3 AM on the second day, a dropped call rate of 11.5% for the first network element during 5 PM to 6 PM on the second day, and a dropped call rate of 12% for the second network element during 2 AM to 3 AM on the second day. Based on the data, the optimization module defines a new tilt value for the antennas of the network elements in the cluster. The optimization module sends a set of signals to the network elements, instructing the network elements to change their antenna tilts accordingly during each time period from the recurring schedule set in the future (i.e., starting from a third day after the second day). Thus, the first network element changes its antenna tilt to the new tilt value during the time period 332 (e.g., 2 AM to 3 AM on the third day) and the time period 334 (e.g., 5 PM to 6 PM on the third day).

In some embodiments, the network optimization device can be configured to define a cluster (or equivalently, a recurring schedule set) and metric values for optimization of that cluster based on a single set of performance indicators. For example, after receiving the first set of dropped call rates from the first day at the first time 352, the network optimization device can be configured to define a recurring schedule set (including the time periods 322, 324, 332 and 334) and define a new tilt value for the antennas of the network elements included in the cluster based on the first set of dropped call rates. As a result, the new tilt value can be sent to and implemented at each corresponding network element during each time period in the future according to the recurring schedule (e.g., the time periods 322 and 324 in the second day, the time periods 332 and 334 in the third day, etc.).

In some embodiments, the network optimization device can be configured to continuously monitor the performance of the cluster. Based on the results from the monitoring, the network optimization device can be configured to repeat the process described above to dynamically optimize or improve performance of the cluster, and/or to modify the recurring schedule set. For example, the network optimization device can be configured to receive a third set of performance indicators (e.g., dropped call rates) from the network elements that are collected during a third instance of the set of time periods (e.g., in the third day) according to the recurring schedule. Similar to the process described above, the network optimization device can be configured to modify parameters of the network elements and/or modify the recurring schedule based on the third set of performance indicators.

In some embodiments, as described above with respect to FIG. 2, a network optimization device can define more than one recurring schedule sets, such that a recurring schedule set with relatively short time periods can be nested within another recurring schedule set with relatively long time periods. For example, as shown in FIG. 3, the recurring schedule sets 382, 384 and 386 include time periods that are measured using quarter of an hour as a unit (e.g., 2:00 AM to 2:15 AM, 5:30 PM to 5:45 PM, etc.). Such recurring schedule sets can be nested within the recurring schedule set described above, which includes time periods that are measured using hour as a unit (e.g., 2 AM to 3 AM, 5 PM to 6 PM, etc.).

Additionally, the recurring schedule sets nested within the previous recurring schedule set can be different from one time period of the previous recurring schedule set to another time period of the previous recurring schedule set. For example, the recurring schedule set 382 included in the time period 312 (e.g., 2 AM to 3 AM in the first day) of the previous recurring schedule set can include 2:00 AM to 2:15 AM and 2:30 AM to 2:45 AM; the recurring schedule set 384 included in the time period 322 (e.g., 2 AM to 3 AM in the second day) of the previous recurring schedule set can include 2:00 AM to 2:15 AM and 2:45 AM to 3:00 AM; and the recurring schedule set 386 included in the time period 332 (e.g., 2 AM to 3 AM in the third day) of the previous recurring schedule set can include 2:15 AM to 2:30 AM and 2:30 AM to 2:45 AM.

Figure 4:
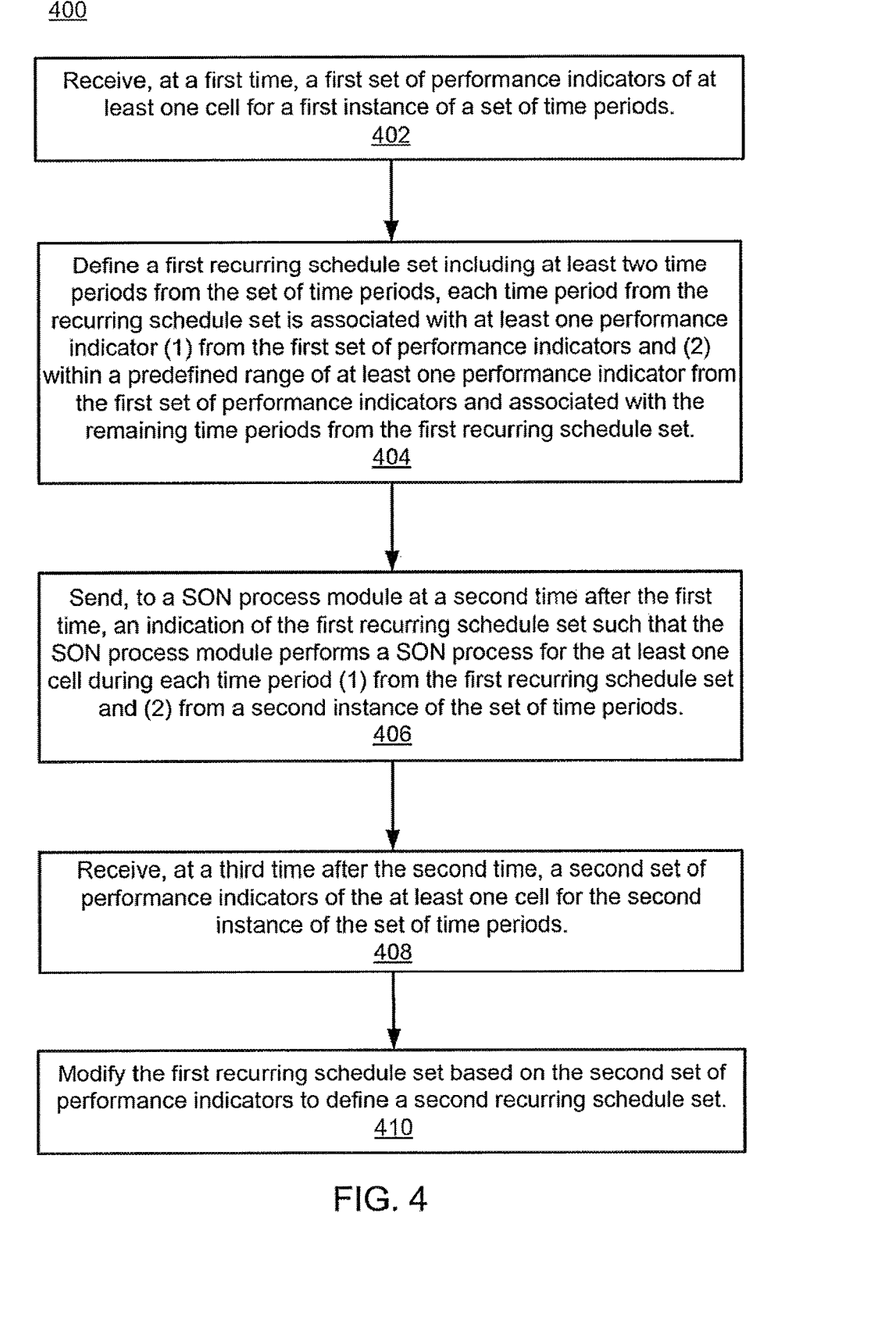
FIG. 4 is a flow chart illustrating a method for defining recurring schedule sets and using the recurring schedule sets for optimization, according to an embodiment.

FIG. 4 is a flow chart illustrating a method 400 for defining recurring schedule sets and using the recurring schedule sets for optimization, according to an embodiment. The code representing instructions to perform method 400 can be stored in, for example, a non-transitory processor-readable medium (e.g., a memory) in a network optimization device that is similar to the network optimization device 101 and 200 shown and described with respect to FIGS. 1 and 2. The code can be executed by a processor of the network optimization device that is similar to the processor 220 in FIG. 2. The code stored in the non-transitory processor-readable medium includes code to be executed by the processor to cause the network optimization device to operate the functions illustrated in FIG. 4 and described as follows.

At 402, a cluster partitioning module of the network optimization device can receive, at a first time, a first set of performance indicators of at least one cell (or equivalently, at least one network element) for a first instance of a set of time periods. The first set of performance indicators can be received from a network database (similar to the network database 120 in FIG. 1) or from network elements of a wireless network that includes the network optimization device. The performance indicators can include, for example, KPIs collected from the network elements during the first instance of the set of time periods.

At 404, the cluster partitioning module of the network optimization device can define a first recurring schedule set including at least two time periods from the set of time periods. Each time period from the recurring schedule set is associated with at least one performance indicator from the first set of performance indicators. Furthermore, each performance indicator associated with a time period from the first recurring schedule set is within a predefined range of each other performance indicator associated with the remaining time periods from the first recurring schedule set. Thus, cells (associated with the corresponding time periods) having the same or similar performance are associated with the common recurring schedule set (or equivalently, a common cluster).

At 406, the cluster partitioning module can send an indication of the first recurring schedule set to a SON process module at a second time after the first time, such that the SON process module performs a SON process for the at least one cell during each time period from the first recurring schedule set and from a second instance of the set of time periods. The SON process module can be similar to the optimization module 224 shown and described with respect to FIG. 2. As a result of performing the SON process, the SON process module can define one or more parameter changes, and send the parameter changes (e.g., via instruction signals) to the cells such that the parameter changes can be implemented at the cells according to the first recurring schedule during the second instance of the set of time periods.

At 408, the network optimization device can receive, at a third time after the second time, a second set of performance indicators of the at least one cell for the second instance of the set of time periods. Based on the second set of performance indicators, at 410, cluster partitioning module of the network optimization device can modify the first recurring schedule set to define a second recurring schedule set. For example, the second recurring schedule set can be defined to be associated with cells (associated with corresponding time periods) having the same or similar performance according to the second set of performance indicators. As the second set of performance indicators may be different from the first set of performance indicators due to the parameter changes during the second instance of the set of time periods, the second recurring schedule set may be different from the first recurring schedule set. Furthermore, similar to the step 406, the cluster partitioning module can send an indication of the second recurring schedule set to the SON process module at a fourth time after the third time, such that the SON process module performs the SON process for the at least one cell during each time period from the second recurring schedule set and from a third instance of the set of time periods.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
   a cluster partitioning module implemented in at least one of a memory or a processing device,
   the cluster partitioning module configured to receive, at a first time, a first set of performance indicators of at least one cell of a network,
   the first set of performance indicators is for a first instance of a plurality of time periods,
   the cluster partitioning module configured to define a recurring schedule set,
   the recurring schedule set including at least two time periods from the plurality of time periods,
      each time period from the recurring schedule set is associated with at least one performance indicator,
      the at least one performance indicator being
         (1) from the first set of performance indicators and
         (2) within a predefined range of at least one performance indicator
            (a) associated with the remaining time periods from the first instance of the plurality of time periods from the recurring schedule set and
            (b) from the first set of performance indicators; and
   an optimization module configured to receive, at a second time after the first time, a second set of performance indicators of the at least one cell,
   the second set of performance indicators is for a second instance of the plurality of time periods,
   the optimization module configured to define a metric value associated with the recurring schedule set based on each performance indicator
      (1) associated with each time period from the recurring schedule set and
      (2) from the second set of performance indicators,
   the optimization module configured to send the metric value to at least one network element associated with the at least one cell such that the at least one network element changes, at each time period (1) from a third instance of the plurality of time periods and (2) from the recurring schedule set, an implementation of the network based on the metric value when the metric value is associated with a network configuration change.

2. The apparatus of claim 1, wherein the metric value is a first metric value, the optimization module is configured to define, after the first time but before the second time, a second metric value for the recurring schedule set based on the first set of performance indicators, the optimization module configured to send the second metric value to the at least one network element such that the at least one network element changes, at each time period (1) from the second instance of the plurality of time periods and (2) from the recurring schedule set, an implementation of the network based on the second metric value when the second metric value is associated with a network configuration change.

3. The apparatus of claim 1, wherein the cluster partitioning module is configured to receive, at a third time after the second time, a third set of performance indicators of the at least one cell for the third instance of the plurality of time periods, the cluster partitioning module configured to modify the recurring schedule set based on the third set of performance indicators.

4. The apparatus of claim 1, wherein:
   the recurring schedule set is a first recurring schedule set;
   the cluster partitioning module is configured to define a second recurring schedule set to include a time period (1) from the plurality of time periods and (2) immediately preceding at least one of the at least two time periods,
   the time period is associated with at least one performance indicator, the at least one performance indicator is
      (1) from the first set of performance indicators and (2) not within the predefined range of the at least one performance indicator associated with the first recurring schedule;

the optimization module is configured to define the metric value associated with the second recurring schedule set; and the optimization module is configured to send the metric value to the at least one network element associated with the at least one cell such that the at least one network element changes, at each time period (1) from the third instance of the plurality of time periods and (2) from the second recurring schedule set, an implementation of the network based on the metric value when the metric value is associated with a network configuration change.

5. The apparatus of claim 1, wherein the optimization module is at least one of an antenna-based Self Optimizing Network (SON) process module or a parameter-based SON process module.

6. The apparatus of claim 1, wherein the metric value is associated with a tilt of an antenna of the at least one network element.

7. The apparatus of claim 1, wherein the optimization module is at least one of a load balancing Self Optimizing Network (SON) process module, a co-channel interference SON process module, a neighbor list SON process module, a handover optimization SON process module or a self-healing SON process module.

8. The apparatus of claim 1, wherein the at least one cell includes a plurality of cells.

9. The apparatus of claim 1, wherein the at least one cell includes a plurality of cells, a subset of time periods from the recurring schedule set and associated with a first cell from the plurality of cells being different from a subset of time periods from the recurring schedule set and associated with a second cell from the plurality of cells.

10. The apparatus of claim 1, wherein the recurring schedule set is a first recurring schedule set, the plurality of time periods is a first plurality of time periods, the optimization module configured to define a second recurring schedule set including at least two time periods from a second plurality of time periods, each instance of the second plurality of time periods including at least one instance of the first plurality of time periods, a duration of each instance of the first plurality of time periods being less than a duration of each instance of the second plurality of time periods.

11. A non-transitory processor-readable medium storing code representing instructions to be executed by a processor, the code comprising code to cause the processor to:

receive, at a first time, a first set of performance indicators of at least one cell for a first instance of a plurality of time periods;

define a first recurring schedule set including at least two time periods from the plurality of time periods, each time period from the recurring schedule set is associated with at least one performance indicator, the at least one performance indicator being
  (1) from the first set of performance indicators and
  (2) within a predefined range of at least one performance indicator
    (a) from the first set of performance indicators and
    (b) associated with the remaining time periods from the first instance of the plurality of time periods from the first recurring schedule set;

send, to a Self Optimizing Network (SON) process module at a second time after the first time, an indication of the first recurring schedule set such that the SON process module performs a SON process for the at least one cell during each time period
  (1) from the first recurring schedule set and
  (2) from a second instance of the plurality of time periods;

receive, at a third time after the second time, a second set of performance indicators of the at least one cell for the second instance of the plurality of time periods; and modify the first recurring schedule set based on the second set of performance indicators to define a second recurring schedule set.

12. The non-transitory processor-readable medium of claim 11, wherein the SON process module is at least one of a load balancing SON process module, a co-channel interference SON process module, a neighbor list SON process module, a handover optimization SON process module or a self-healing SON process module.

13. The non-transitory processor-readable medium of claim 11, the code further comprising code to cause the processor to:

send, to the SON process module at a fourth time after the third time, an indication of the second recurring schedule set such that the SON process module performs the SON process within the at least one cell during each time period (1) from the second recurring schedule set and (2) from a third instance of the plurality of time periods.

14. The non-transitory processor-readable medium of claim 11, wherein the second recurring schedule set includes a time period not included in the first recurring schedule set and from the plurality of time periods.

15. An apparatus, comprising:

a cluster partitioning module implemented in at least one of a memory or a processing device, the cluster partitioning module configured to receive a set of performance indicators
  (1) of a plurality of cells of a network
  (2) for a first instance of a plurality of time periods, the cluster partitioning module configured to define a recurring schedule set, the recurring schedule set including at least
  (1) a first time period
    (a) from the plurality of time periods and
    (b) associated with a first cell from the plurality of cells and
  (2) a second time period
    (a) from the plurality of time periods and
    (b) associated with a second cell from the plurality of cells, the first cell at the first time period being associated with at least one performance indicator, the at least one performance indicator being
  (1) from the set of performance indicators and
  (2) within a predefined range of at least one performance indicator
    (a) associated with the second cell at the second time period and
    (b) from the set of performance indicators; and an optimization module configured to define at least one metric value for the recurring schedule set based at least in part on
  (1) the at least one performance indicator associated with the first cell at the first time period and
  (2) the at least one performance indicator associated with the second cell at the second time period, the optimization module configured to send the at least one metric value to a network element associated with the first cell such that the network element associated with the first cell changes, at the first time period from a second instance of the plurality of time periods, an implementation of the network based on the metric value when the metric value is associated with a network configuration change at the first time period from the second instance of the plurality of time periods, the optimization module configured to send the at least one metric value to a network element associated with the second cell such that the network element associated with the second cell changes, at the second time period from the second instance of the plurality of time periods, an implementation of the network based on the metric value when the metric value is associated with a network configuration change at the second time period from the second instance of the plurality of time periods.

16. The apparatus of claim 15, wherein the first time period is different from the second time period.

17. The apparatus of claim 15, wherein the set of performance indicators is a first set of performance indicators, the cluster partitioning module configured to receive the first set of performance indicators at a first time, the cluster partitioning module is configured to receive, at a second time after the first time, a second set of performance indicators of the plurality of cells for the second instance of the plurality of time periods, the cluster partitioning module configured to modify the recurring schedule set based on the second set of performance indicators.

18. The apparatus of claim 15, wherein the optimization module is at least one of a load balancing Self Optimizing Network (SON) process module, a co-channel interference SON process module, a neighbor list SON process module, a handover optimization SON process module or a self-healing SON process module.

19. The apparatus of claim 15, wherein the at least one metric value is associated with a tilt of an antenna of the at least one network element.

20. The apparatus of claim 15, wherein the optimization module is at least one of an antenna-based Self Optimizing Network (SON) process module or a parameter-based SON process module.

* * * * *